United States Patent [19]

Dunn

[11] Patent Number: 4,620,471
[45] Date of Patent: Nov. 4, 1986

[54] CHORD SELECTOR FOR KEYBOARD MUSICAL INSTRUMENTS

[76] Inventor: Roger Dunn, 1003 Galinée Street, Saint-Bruno, Canada, J3V 3W5

[21] Appl. No.: 618,474

[22] Filed: Jun. 8, 1984

[51] Int. Cl.⁴ ............................................. G09B 15/08
[52] U.S. Cl. .................................. 84/480; 84/485 SR
[58] Field of Search ................... 84/471 SR, 473, 474, 84/480, 485 SR; 235/88 R

[56] References Cited

U.S. PATENT DOCUMENTS

| | | | |
|---|---|---|---|
| 1,822,457 | 9/1931 | Ferguson-Roberts | 84/473 |
| 2,193,885 | 3/1940 | Riley | 84/471 SR |
| 2,332,842 | 10/1943 | Champion | 84/473 |
| 2,542,235 | 2/1951 | Clopton | 84/474 |
| 2,649,008 | 8/1953 | Bova et al. | 84/474 |
| 3,784,797 | 1/1974 | Kroll | 235/88 R |

FOREIGN PATENT DOCUMENTS 773425 12/1967 Canada .

Primary Examiner—Benjamin R. Fuller

[57] ABSTRACT

A music chart for determining the constituent tones of a plurality of chords and the chord name of a given series of tones is disclosed. The chart is comprised of a disc having at its outer circumference a plurality of spaced-apart chord names. Each chord name lies along a radius of the disc, each radius having delineated thereon a plurality of markers radially spaced from each other. A slide member having an elongated narrow rectangular window is slidably and pivotally superimposed on the disc by means of a central rivet projecting through the window. The slide member has at its lower side a graphic representation of a keyboard which is lettered according to conventional keyboard construction and includes at least two octaves. By rotating and sliding the slide member over the disc a chord name and its constituent tones are easily readable in the window.

1 Claim, 7 Drawing Figures

C—C major chord (C major triad).

sus—suspended. The perfect fourth substitutes for the major third.

m—containing the interval of a minor third.

Cm—C minor chord (C minor triad).

°—diminished triad.

4—a chord constructed of perfect fourths.

+ (or +5)—containing the interval of an augmented fifth.

C+—C augmented chord (C augmented triad).

5—a combination of tones containing only the root and the perfect fifth.

-5—containing the interval of a diminished fifth.

6—containing the interval of a major sixth.

C6—C major sixth chord.

7—containing the interval of a minor seventh.

C7—C seventh chord (C dominant seventh chord).

maj 7 (or #7)—containing the interval of a major seventh.

dim—diminished seventh chord.

9—containing the interval of a major ninth.

C9—C ninth chord (C dominant ninth chord).

maj 9—a major seventh chord to which is added a major ninth.

+9—containing the interval of an augmented ninth.

-9—containing the interval of a minor ninth.

11—containing the interval of a perfect eleventh.

C11—C eleventh chord (C dominant eleventh chord).

aug 11 (or +11)—containing the interval of an augmented eleventh.

13—containing the interval of a major thirteenth.

C13—C thirteenth chord (C dominant thirteenth chord).

CHORD SELECTOR FOR KEYBOARD MUSICAL INSTRUMENTS

FIELD OF THE INVENTION

The present invention pertains generally to music information charts more specifically to a chart which is very practical to an interested person who wants to quickly determine the musical structure of an indefinite number of chords playable on a keyboard instrument, but not exclusively so.

BACKGROUND OF THE INVENTION

Ever since the creative innovation of organum during the middle ages (organum being the simultaneous singing of two melodic lines a fourth or a fifth apart) harmony has been one of the distinctive characteristics of almost all forms of western music. Today harmony has evolved into a complex manifestation of art and science as embodied, for example, in music theory. In practice, one of these manifestations is the playing of chords on several instruments, notably keyboards and the large family of string instruments. There is a very large number of such chords in the musical repertoire, ranging from simple chords having only two constituent tones or major and minor chords composed of three tones to complex chords used in jazz which may have been seven or even more constituent tones.

Thus, it will be apparent that it takes time for an interested person-even a gifted musician-to develop and train the ear to become harmonically sensitive. Yet this process is certainly worthwhile, for music, like all art, is ultimately meant to be immensely pleasing and enriching experience.

Accordingly, many techniques have been invented to help among the path to the appreciation of harmony as well as other facets of music. The most important technique is of course the translation of music into written visual symbols or notation, along with many more or less elaborate visual aids. The present invention belongs to the latter class.

The visual aids proposed in the past by the prior art are generally deficient in that they are difficult to read, difficult to handle or too generic. For example, the Canadian Pat. No. 773,425 issued to Y. A. Gaillard on Dec. 12, 1967 teaches an extensively detailed layout including several discs, a slide "memory" arranged in the so-called "circle of fifths" and an "album" provided with a pocket 8 (see FIG. 5) for storing unused discs.

Another patent, issued in the United States to M. L. Clopton on Feb. 20, 1951 and bearing U.S. Pat. No. 2,542,235 discloses a dial having two printed faces wherein the circumference of each face is delineated again according to the circle of fifths. The mechanism also includes a face plate provided with a plurality of windows in which appear a variety of musical data as the dial is rotated. A pointer attached to the dial is adapted to move in an arc made therefor in the face plate. Although simplified in relation to prior devices, this mechanism is still apt to create confusion.

Still another U.S. Pat., No. 2,649,008 issued to Fred Bova et al on Aug. 18, 1953 features two discs and a slide rule sandwiched therebetween. Again, there are several windows from which desired musical data may be obtained. This chart is perhaps not too generic, being specifically limited to stringed instruments, but is still relatively complicated and difficult to read.

OBJECTS OF THE INVENTION

In view of the above it is an important object of the present invention to provide a music information chart which enables an interested person to quickly identify the constituent tones of a large number of chords and, conversely, to identify the chord name of a given series of constituent tones.

It is another object of the invention to provide a music chart of the character described which is of novel, simple and very easy to read construction.

SUMMARY OF THE INVENTION

These and other objects and advantages of the present invention are realized according to a preferred embodiment comprising a disc having a facial circumference which is delineated at regularly-spaced lengths of arc with a plurality of chord names. By way of example, the chords may include several of the major and minor chords, augmented or diminished and a plurality of variations of ninth, eleventh and thirteenth chords such as are used in jazz or other non-classical music. The chord names so delineated may thus be varied to suit the particular musical interests of a user of the chart.

Preferably, a circumferential line spaced radially inwardly from the chord names is provided.

Along the radius defined by each chord name and the center of the disc a plurality of radially-spaced markers are imprinted on the same face of the disc. The marker adjacent each chord name is preferably of a hue which contrasts with all the other markers on the same radius.

A preferably rectangular slide member is slidably and pivotally super-imposed on the disc. This slide member is formed with a central lengthwise extending rectangular window having a width just slightly greater than the width of a marker on the disc (which are all identical in size). The slide member is secured to the disc by an attachment means secured at the center of the latter and which projects through the window.

The lower lengthwise side of the window is in turn inprinted with a graphic representation of a keyboard, preferably having all the white "keys" lettered according to the tones of the scale. Preferably, the first of left hand white key is lettered "C". The graphic keyboard representation extends for at least two octaves, whereby the left hand key of "C", being placed opposite the outermost marker on the disc, will be the "root" or base note for a chord including the interval of a thirteenth. Preferably, however, the keyboard extends over three octaves so that any note within the first octave can be placed opposite the outermost marker thus including a thirteenth interval for any "root" note in the chromatic scale.

The window extends further leftwardly of the first left hand "C" so that the name of a particular chord selected will also appear in the window.

BRIEF DESCRIPTION OF THE DRAWINGS

The above will be more clearly understood by having referral to a preferred embodiment of the invention, illustrated by way of the accompanying drawings, in which:

FIG. 7 is a table lifting the definitions of a plurality of chord names inscribable on the disc.

Like numerals refer to like elements throughout the drawings.

DETAILED DESCRIPTION OF THE PREFERRED EMBODIMENT

Figure 1:
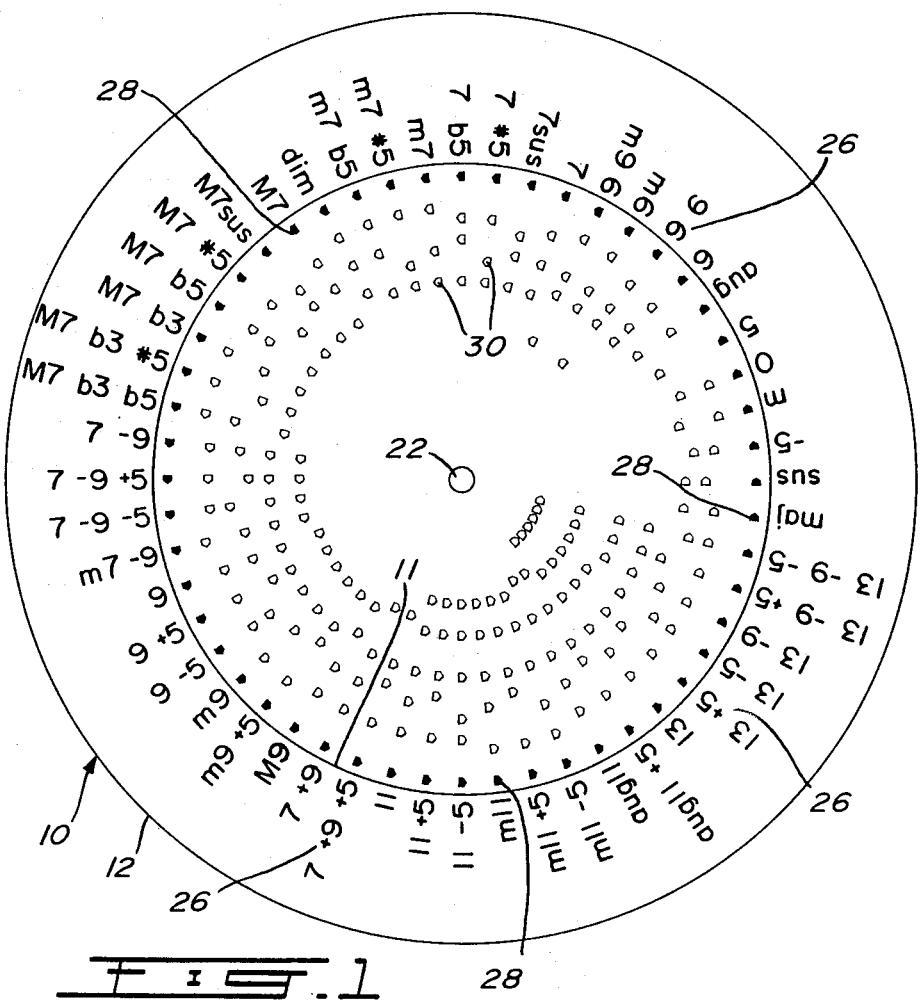
FIG. 1 is a top plan view of the disc according to the invention.
Figure 2:
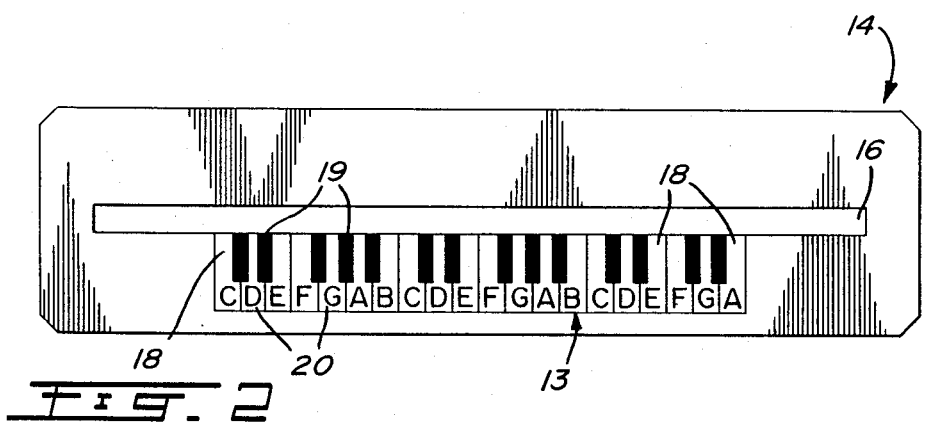
FIG. 2 is a top plan view of the slide member of the invention.
Figure 3:
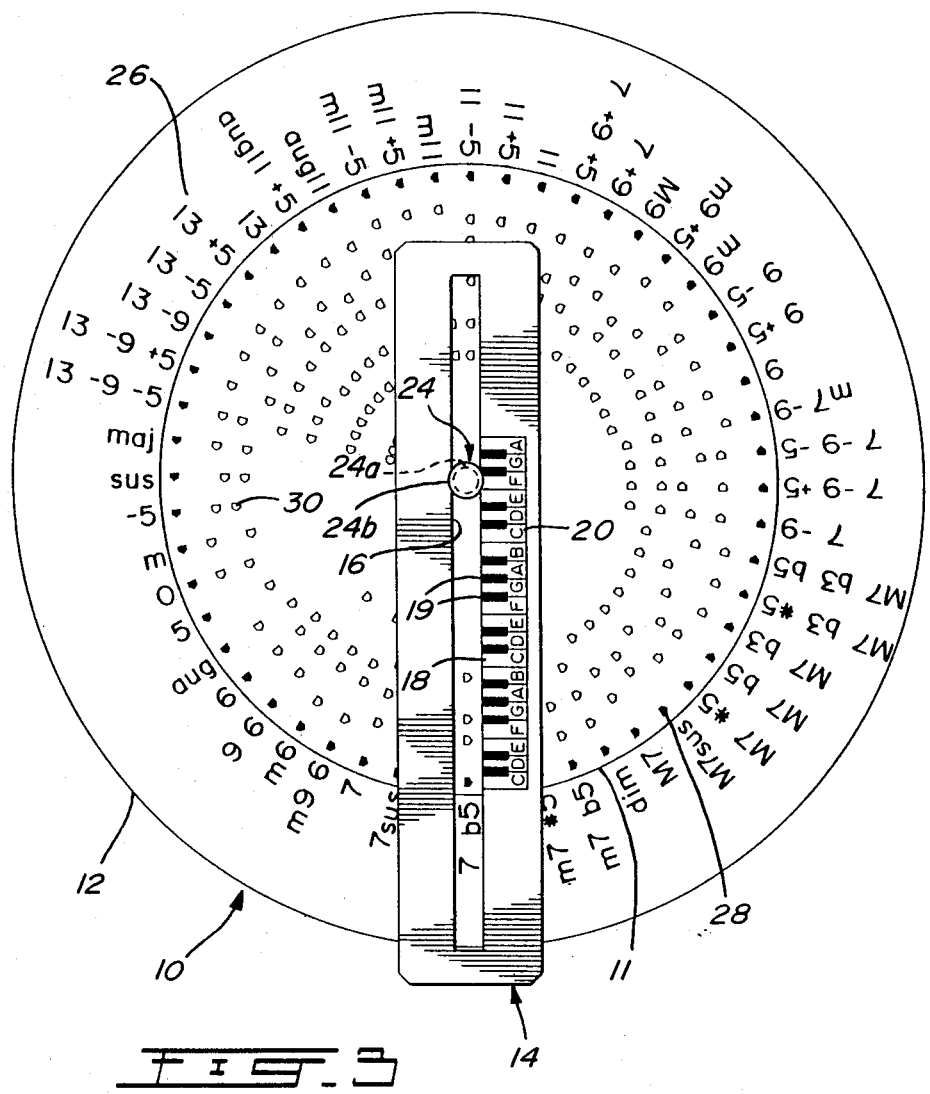
FIG. 3 is a top plan view of the disc and superimposed slide member showing how the notes for a chosen chord (in the figure the chord includes the intervals of a minor seventh and a flatted fifth) appear in the window along with the chord name.

Referring firstly to FIGS. 1–3 inclusively, there is shown the two elements of the invention, a large circular disc 10 and a rectangular slide member 14. Disc 10 has an outer edge 12 and a radially inwardly spaced circular line 11, both edge 12 and line 11 being concentric with the center of the disc. The annular space defined between edge 12 and line 11 is delineated at regularly-spaced lengths of arc with a plurality of alphanumeric chord names 26 arranged so that each chord name is readable at the nine o'clock position of disc 10.

Along the radius of each chord name 26 a plurality of markers 28 and 30 are inscribed on the same face of the disc as the chord names. Each marker is generally of an arrow head shape pointing downwardly at the left side of the disc. The outermost markers 28 along each radius are black while the other markers 30 are white or at least of a contrasting colour.

Although in the embodiment depicted there are fifty-two chord names it is to be understood that more or fewer chord names could be provided in keeping with the size of the disc and the indicia.

Slide member 14 is plate a flat plate that is generally of an elongated rectangular shape, and that is movably superimposed over the face of disc 10 on which names 26 and markers 28, 30 are inscribed. Slide 14 is formed with a narrow central lengthwise window 16 through which projects a rivet or other suitable attachment means 24 which is secured to disc 10 by extending through the center hole 22 of disc 10. Rivet 24 has a stem 24a extending through hole 22 and riveted at the back of disc 10 and a head 24b slidably overlying the slide plate on each side of window 16, thus slidably retaining slide plate 14 on disc 10. Thus, slide 14 is free both for pivoting around rivet 24 as well as diametrical sliding relative to disc 10 along window 16. The lower surface of slide 14 has imprinted thereon a graphic keyboard 13 including white keys 18, black sharp and flat keys 19 and letters 20, beginning with "C" on the left hand side and proceeding up the scale according to the conventional construction of a piano keyboard. As shown, the keyboard 13 includes almost three full octaves.

FIGS. 3–6 illustrate how the invention is used. Firstly, a particular chord is selected, for example a chord containing the intervals of a minor seventh (m7) andd a flatted fifth (5), and is made to appear in window 16 by pivoting and sliding slide 14 to the proper position over disc 10. Supposing a user wises to know the constituent notes of this particular chord with "C" as the base or root note he or she simply slides slide 14 to the position wherein the adjacent black marker 28 is opposite "C" and points thereto in window 16. It is then a simple matter to read the other notes of the chord, in this case E, Gb and Bb, as indicated by the white markers 30 also appearing in window 16.

Figure 4:
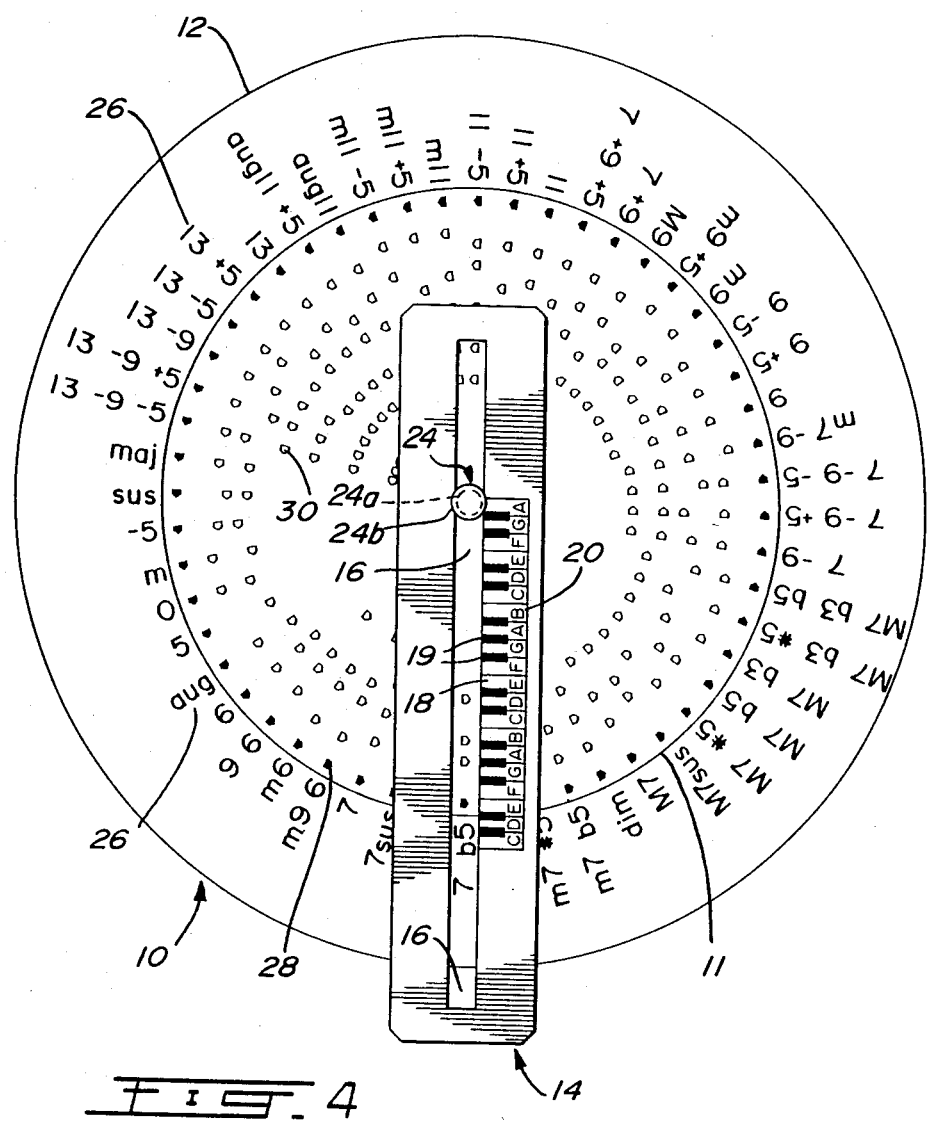
FIGS. 4–6 are top plan views similar to that of FIG. 3 showing how the slider can be moved radially to select different "root" notes (in the figures E, Gb and Bb) in the chromatic scale for the same chord.
Figure 5:
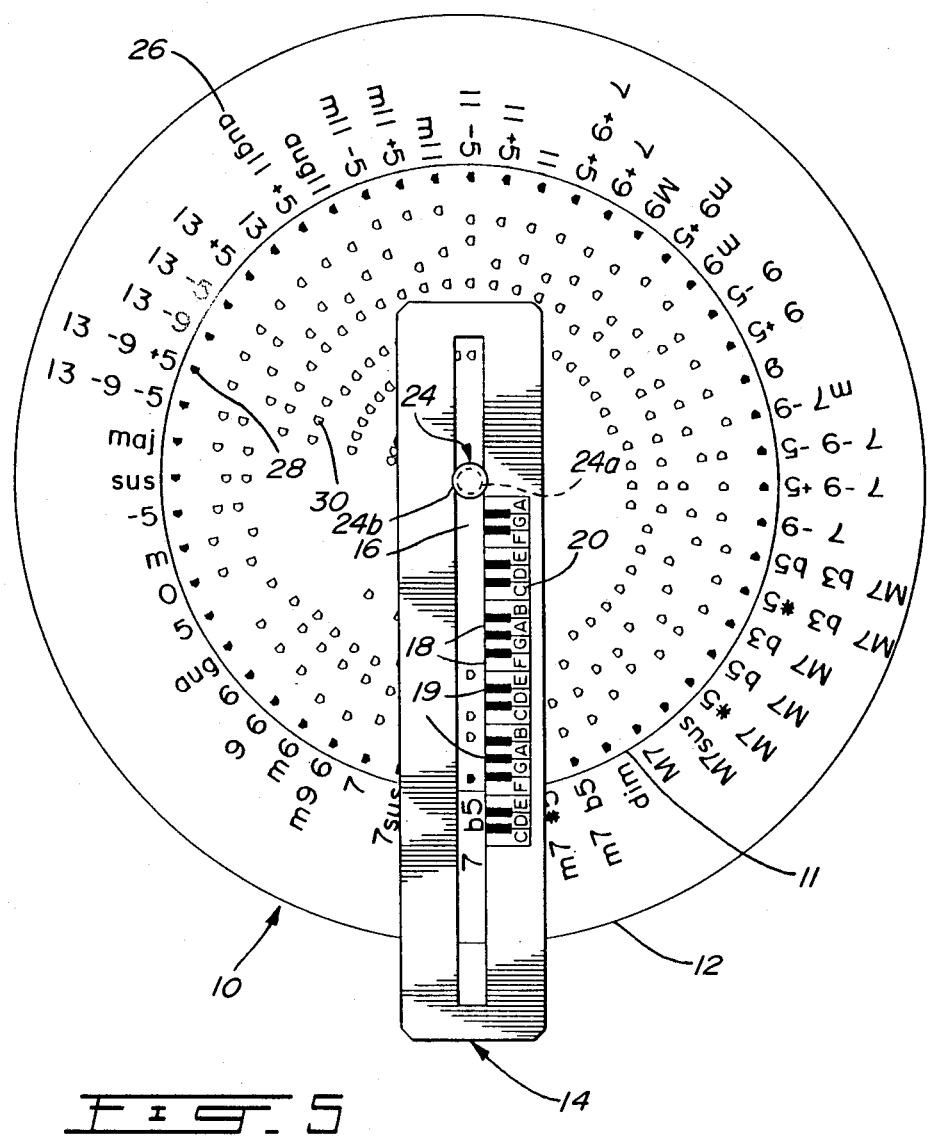
Figure 6:
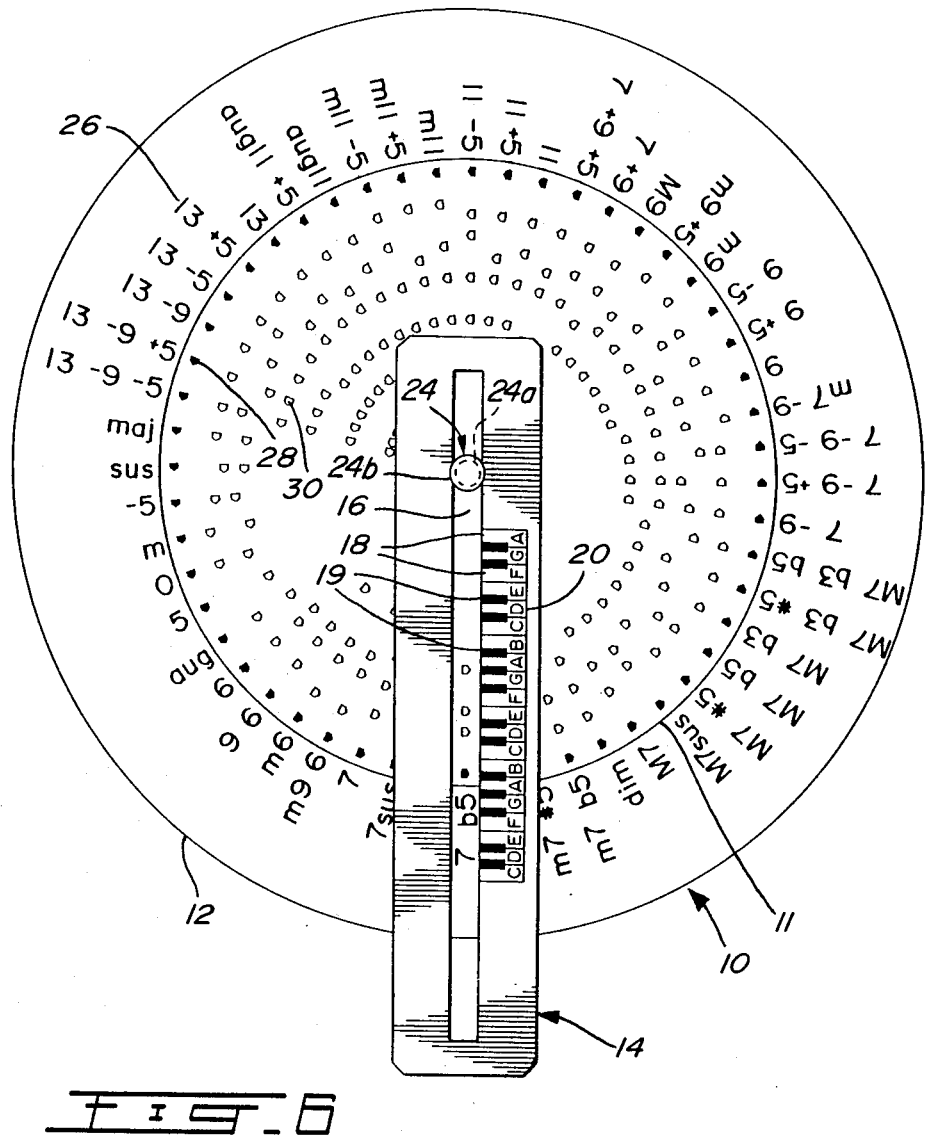

Similarly, if it is desired to know the notes of the same chord played with a different root, slide 14 is moved such that black marker 28 is opposite the desired root note as shown in FIGS. 4–6.

The same procedure can be repeated with any chord name.

As mentioned above, the invention also lends itself to determining the proper chord name of any group of constituent notes. This is simply done by locating a group of tones in window 16 and then reading the cord name at the left side of the window.

It is to be noted that the various groups of tones so obtained can easily be transposed to another instrument since the letters of the keyboard are clearly indicated on the graphic display. Also, it is a simple matter to read the first and second inversion forms of any particular chord.

FIG. 7 is self-explanatory and its information corresponds to the chord sequences chosen as an illustrative embodiment on disc 10.

What I claim is:

1. An identification chart for chords and their constituent notes, comprising: a flat base sheet having a pivot in its center portion and an elongated first slide plate overlying one face of said base sheet and having a longitudinally-extending window, through which said pivot extends, means carried by said pivot slidably overlying said slide plate and retaining the latter, whereby it can be rotated and radially shifted relative to said base sheet about said pivot, said slide plate bearing along one longitudinal edge of said window, a graphic representation of a piano keyboard including at least two octaves with the key representations of the keyboard in ascending tone order from left to right along said window, the left-handmost key representing a C note, said window extending beyond both ends of said piano keyboard representation, said base sheet carrying on said one face the names of different chords, each arranged along a radius of said pivot, each radius substantially equally angularly spaced from two adjacent radii, said names contained in an annular area radially spaced from and concentric with said pivot, said base sheet further carrying, radially inwardly of said annular area and on said one face, a plurality of sets of markers, with the markers of each set radially aligned with one of said chord names, the radially outermost markers of said set being disposed along a circle concentric with said pivot and having a colour contrasting with the colour of the remaining markers, any selected one of said chord names, together with the associated set of markers on the same radius, appearing through said window for any selected rotated position and any radially-shifted position of said slide plate, the markers of any set being spaced from one another, so as to register with the keys of the piano keyboard representation corresponding to the notes of the chord, the name of which appears through the window, for any selected root note of the same chord placed in register with the radially innermost marker of the set.

* * * * *